US010284761B2

United States Patent
Chen et al.

(10) Patent No.: US 10,284,761 B2
(45) Date of Patent: May 7, 2019

(54) MULTI-CAMERA CAPTURE OF A HIGH DYNAMIC RANGE IMAGE

(71) Applicant: MOTOROLA MOBILITY LLC, Chicago, IL (US)

(72) Inventors: Yin Hu Chen, Deerfield, IL (US); Valeriy Marchevsky, Glenview, IL (US); Susan Yanqing Xu, Westmont, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/354,501

(22) Filed: Nov. 17, 2016

(65) Prior Publication Data

US 2018/0139367 A1    May 17, 2018

(51) Int. Cl.
*H04N 5/225* (2006.01)
*H04N 5/235* (2006.01)
*H04N 5/355* (2011.01)

(52) U.S. Cl.
CPC ......... *H04N 5/2258* (2013.01); *H04N 5/2353* (2013.01); *H04N 5/2355* (2013.01); *G06T 2207/20208* (2013.01); *G06T 2207/20221* (2013.01); *H04N 5/35554* (2013.01)

(58) Field of Classification Search
CPC .. H04N 5/2258; H04N 5/2353; H04N 5/2355; H04N 5/35536; H04N 5/35545; H04N 5/35554; G06T 5/007
See application file for complete search history.

(56) References Cited

U.S. PATENT DOCUMENTS

| 8,213,786 | B2 | 7/2012 | Song |
| 8,416,303 | B2 | 4/2013 | Gomi |
| 9,703,175 | B2 | 7/2017 | Dayana et al. |
| 9,886,640 | B1 | 2/2018 | Chen et al. |
| 10,057,499 | B1 | 8/2018 | Chen et al. |
| 2002/0136435 | A1 | 9/2002 | Prokoski |
| 2007/0189583 | A1 | 8/2007 | Shimada et al. |

(Continued)

OTHER PUBLICATIONS

Bagheri, Saeid et al., U.S. Appl. No. 15/476,729, filed Mar. 31, 2017, The United States Patent and Trademark Office.

(Continued)

*Primary Examiner* — Daniel M Pasiewicz
(74) *Attorney, Agent, or Firm* — Yudell Isidore PLLC (57) ABSTRACT

A method, system, and computer program product for generating a high dynamic range (HDR) image from a plurality of frames simultaneously captured by cameras of a portable device. The method includes detecting, by a main camera of the portable device, a current dynamic range level of a current scene. In response to detecting the current dynamic range level, a main camera exposure compensation value is applied to the main camera and an auxiliary camera exposure compensation value, which is different from the main camera exposure compensation value, is applied to at least one auxiliary camera. The method further includes simultaneously capturing a first frame by the main camera and at least one second frame by at least one auxiliary camera. The method further includes combining the first frame and the at least one second frame to create the HDR image.

18 Claims, 4 Drawing Sheets

(56) References Cited

U.S. PATENT DOCUMENTS

| | | | |
|---|---|---|---|
| 2008/0094486 A1* | 4/2008 | Fuh | G06T 5/009 348/229.1 |
| 2010/0128938 A1 | 5/2010 | Chung et al. | |
| 2010/0134250 A1 | 6/2010 | Chung et al. | |
| 2012/0002082 A1* | 1/2012 | Johnson | G06T 5/50 348/234 |
| 2012/0147139 A1 | 6/2012 | Li et al. | |
| 2012/0257065 A1 | 10/2012 | Velarde et al. | |
| 2013/0235163 A1 | 9/2013 | Joo | |
| 2014/0337930 A1 | 11/2014 | Hoyos et al. | |
| 2015/0092066 A1* | 4/2015 | Geiss | H04N 5/2258 348/180 |
| 2016/0227100 A1 | 8/2016 | Liu et al. | |
| 2016/0295097 A1 | 10/2016 | Shanmugavadivelu et al. | |
| 2016/0299349 A1 | 10/2016 | Cho | |
| 2016/0301840 A1* | 10/2016 | Du | H04N 13/0239 |
| 2017/0017136 A1 | 1/2017 | Kao et al. | |
| 2017/0064184 A1 | 3/2017 | Tsai | |
| 2017/0163902 A1* | 6/2017 | Wu | H04N 5/2355 |
| 2017/0201684 A1 | 7/2017 | Kang et al. | |
| 2017/0277018 A1 | 9/2017 | Dayana et al. | |
| 2017/0324906 A1 | 11/2017 | Kang et al. | |
| 2018/0039845 A1 | 2/2018 | Chen et al. | |
| 2018/0096212 A1 | 4/2018 | Lin | |
| 2018/0139369 A1 | 5/2018 | Chen et al. | |

OTHER PUBLICATIONS

Chen, Yin-Hu et al., U.S. Appl. No. 15/398,532, filed Jan. 4, 2017, The United States Patent and Trademark Office.

Chen, Yin-Hu et al., U.S. Appl. No. 15/353,435, filed Nov. 16, 2016, The United States Patent and Trademark Office.

Chen, Yin-Hu, et al., U.S. Appl. No. 15/441,085, filed Feb. 23, 2017, The United States Patent and Trademark Office.

Chen, Yin-Hu, et al., U.S. Appl. No. 15/438,699, filed Feb. 21, 2017, The United States Patent and Trademark Office.

Chen, Yin-Hu, et al., U.S. Appl. No. 15/459,621, filed Mar. 15, 2017, The United States Patent and Trademark Office.

Li, Dalong, et al., U.S. Appl. No. 15/013,232, filed Feb. 2, 2016, The United States Patent and Trademark Office.

Li, Qiaotian, et al., U.S. Appl. No. 15/464,118, filed Mar. 20, 2017, The United States Patent and Trademark Office.

Matsimanis, Peter, et al., U.S. Appl. No. 15/435,503, filed Feb. 17, 2017, The United States Patent and Trademark Office.

Musatenko, Yuriy, et al., U.S. Appl. No. 15/349,948, filed Nov. 11, 2016, The United States Patent and Trademark Office.

Giles, Nicholas G., Non-Final Office Action, U.S. Appl. No. 15/435,503, The United States Patent and Trademark Office, dated Jun. 21, 2018.

Monk, Mark T., Final Office Action, U.S. Appl. No. 15/464,118, The United States Patent and Trademark Office, dated Aug. 21, 2018.

Segura, Cynthia, Non-Final Office Action, U.S. Appl. No. 15/398,532, The United States Patent and Trademark Office, dated Sep. 4, 2018.

Ho, Tuan V., Non-Final Office Action, U.S. Appl. No. 15/464,118, The United States Patent and Trademark Office, dated Feb. 23, 2018.

Ngyuen, Luong Trung, Non-Final Office Action, U.S. Appl. No. 15/459,621, The United States Patent and Trademark Office, dated Sep. 19, 2018.

\* cited by examiner

MULTI-CAMERA CAPTURE OF A HIGH DYNAMIC RANGE IMAGE

BACKGROUND

1. Technical Field

The present disclosure generally relates to portable devices and in particular to an improved method for capturing a high dynamic range image using two or more cameras working in tandem.

2. Description of the Related Art

Modern portable communication devices, such as cellular phones, are equipped with a camera that can be used to capture high dynamic range (HDR) images. A HDR image may be created by serially capturing a plurality of standard images with different exposure time of each subsequent image. However, because the standard images are captured serially, any movement in the scene between frames may cause blurring in the final HDR image and/or render the standard images unable to be combined. Additionally, existing HDR solutions might require a user manually activate an HDR option before HDR images may be captured. Furthermore, many current HDR solutions require that a current scene be analyzed to determine whether a dynamic range of the scene is above a particular threshold before an HDR image may be captured. If the dynamic range of the scene is not above the particular threshold, only standard images may be captured.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, system, and computer program product for generating a high dynamic range (HDR) image from a plurality of frames simultaneously captured by cameras of a portable device. The method includes detecting, by a main camera of the portable device, a current dynamic range level of a current scene. In response to detecting the current dynamic range level, a main camera exposure compensation value is applied to the main camera and an auxiliary camera exposure compensation value, which is different from the main camera exposure compensation value, is applied to at least one auxiliary camera. The method further includes simultaneously capturing a first frame by the main camera and at least one second frame by at least one auxiliary camera. The method further includes combining the first frame and the at least one second frame to create the HDR image.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within portable device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
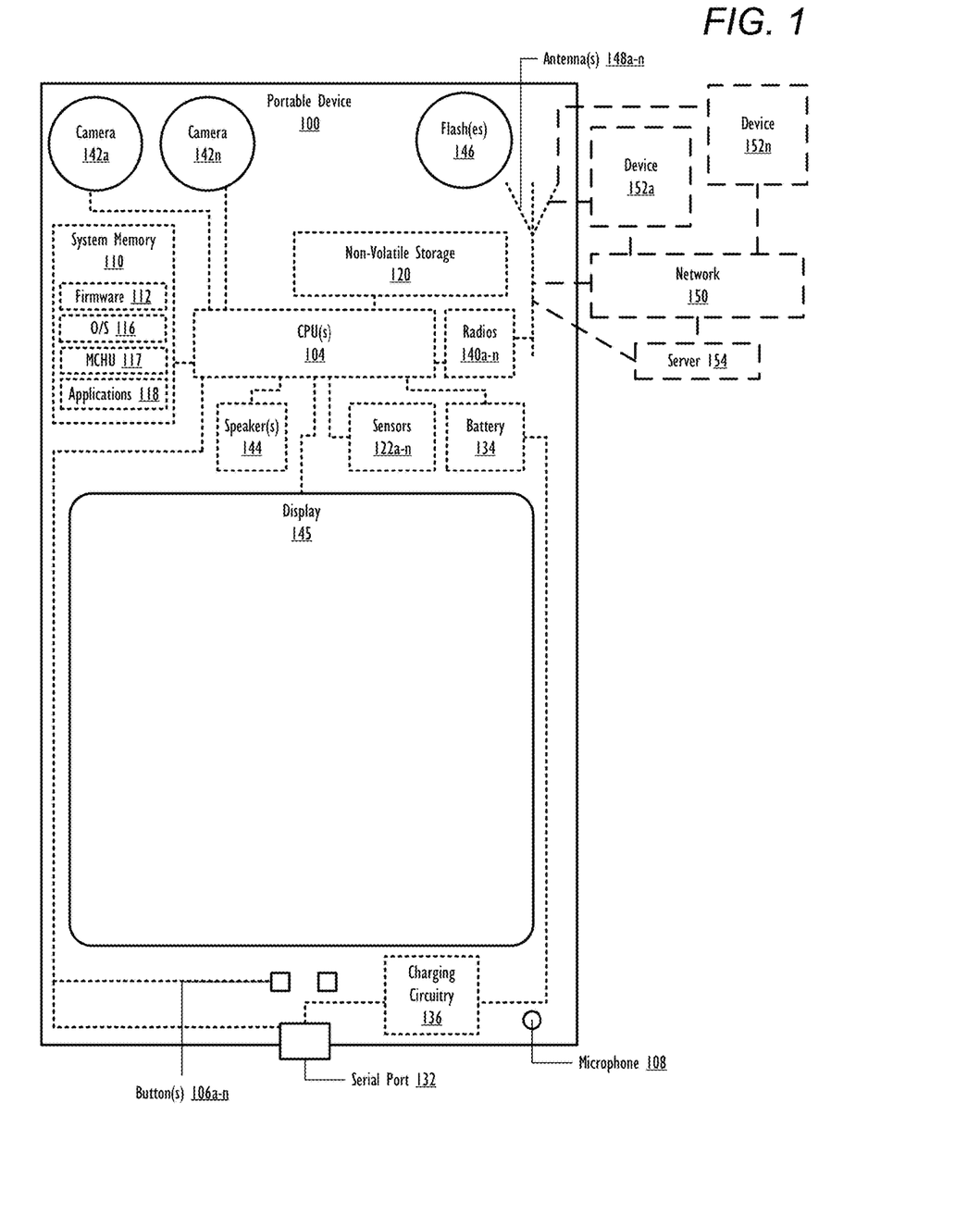
FIG. 1 illustrates a portable device within which certain aspects of the disclosure can be practiced, in accordance with one or more embodiments.

Now turning to FIG. 1, there is illustrated an example portable device 100 within which one or more of the described features of the various embodiments of the disclosure can be implemented. In one embodiment, portable device 100 can be any portable device that is equipped with at least two cameras, and an example portable device can include, but is not limited to, a notebook computer, mobile phone, digital camera, video recorder, or tablet computer. Portable device 100 includes at least one processor or central processing unit (CPU) 104. CPU 104 is coupled to non-volatile storage 120 and system memory 110, within which firmware 112, operating system (OS) 116, multi-camera HDR utility (MCHU) 117, and applications 118 can be stored for execution on CPU 104. According to one aspect, MCHU 117 executes within portable device 100 to perform the various methods and functions described herein. In one or more embodiments, MCHU 117 simultaneously captures frames by a first camera and at least one auxiliary camera and combines the frames to create a HDR image. For simplicity, MCHU 117 is illustrated and described as a stand-alone or separate software/firmware/logic component, which provides the specific functions and methods described below. However, in at least one embodiment, MCHU 117 may be a component of, may be combined with, or may be incorporated within firmware 112, or OS 116, and/or within one or more of applications 118.

As shown, portable device 100 may include input devices and output devices that enable a user to interface with portable device 100. In the illustrated embodiment, portable device 100 includes at least two cameras 142a-n, camera flash(es) 146, display 145, hardware buttons 106a-n, microphone(s) 108, and speaker(s) 144. While two cameras (cameras 142a-n) are illustrated, in one or more embodiments portable device 100 may include additional cameras. Hardware buttons 106a-n are selectable buttons which are used to receive manual/tactile input from a user to control specific operations of portable device 100 and/or of applications executing thereon. In one embodiment, hardware buttons 106a-n may also include or may be connected to one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of portable device 100. In one embodiment, hardware buttons 106a-n may include a keyboard. Microphone(s) 108 may be used to receive spoken input/commands from a user. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, proximity sensors, camera/image sensors, accelerometers, gyroscopes, magnetometers, microphones, barometers, air humidity sensors, pedometers, heart rate monitors, fingerprint sensors, radiation sensors, and iris scanners. Display 145 is capable of displaying text, media content, and/or a graphical user interface (GUI) of firmware and/or one or more applications executing on portable device 100. The GUI can be rendered by CPU 104 for viewing on display 145 in one embodiment or be rendered by a graphics processing unit (GPU), in another embodiment. In one embodiment, display 145 is a touch screen that is also capable of receiving touch input from a user of portable device 100, when the user is interfacing with a displayed GUI. In at least one embodiment, portable device 100 can include a plurality of virtual buttons or affordances that operate in addition to, or in lieu of, hardware buttons 106a-n. For example, portable device 100 can be equipped with a touch screen interface and provide, via a GUI, a virtual keyboard or other virtual icons for user interfacing therewith. In at least one embodiment, portable device 100 can include a plurality of virtual buttons or affordances that operate in addition to or in lieu of hardware buttons 106a-n.

Portable device 100 also includes battery 134, charging circuitry 136, and serial port 132 (e.g., a USB (universal serial bus) port) which can operate as a charging port that receives power via an external charging device (not pictured) for charging battery 134. Serial port 132 may also function as one of an input port, an output port, and a combination input/output port. Serial port 132 also provides a physical interface between charging circuitry 136 and an external charging device (not pictured) for charging battery 134. Battery 134 may include a single battery or multiple batteries for providing power to components of portable device 100. In one embodiment, battery 134 may include at least one battery that is removable and/or replaceable by an end user. In another embodiment, battery 134 may include at least one battery that is permanently secured to portable device 100.

Portable device 100 also includes one or more wireless radios 140a-n and can include one or more antenna(s) 148a-n that enable portable device 100 to wirelessly connect to, and transmit and receive voice and/or data communication to/from one or more other devices, such as devices 152a-n and server 154. As a wireless device, portable device 100 can transmit data over a wireless network 150 (e.g., a Wi-Fi network, cellular network, Bluetooth® network (including Bluetooth® low energy (BLE) networks), a wireless ad hoc network (WANET), or personal area network(PAN)).

In one embodiment, portable device 100 may be further equipped with an infrared (IR) device (not pictured) for communicating with other devices using an IR connection. In another embodiment, wireless radios 140a-n may include a short-range wireless device, including, but not limited to, a near field communication (NFC) device. In still another embodiment, portable device 100 may communicate with one or more other device(s) using a wired or wireless USB connection. In one or more embodiments, devices 152a-n may include one or more accessories (e.g., accessory 160).

Figure 2:
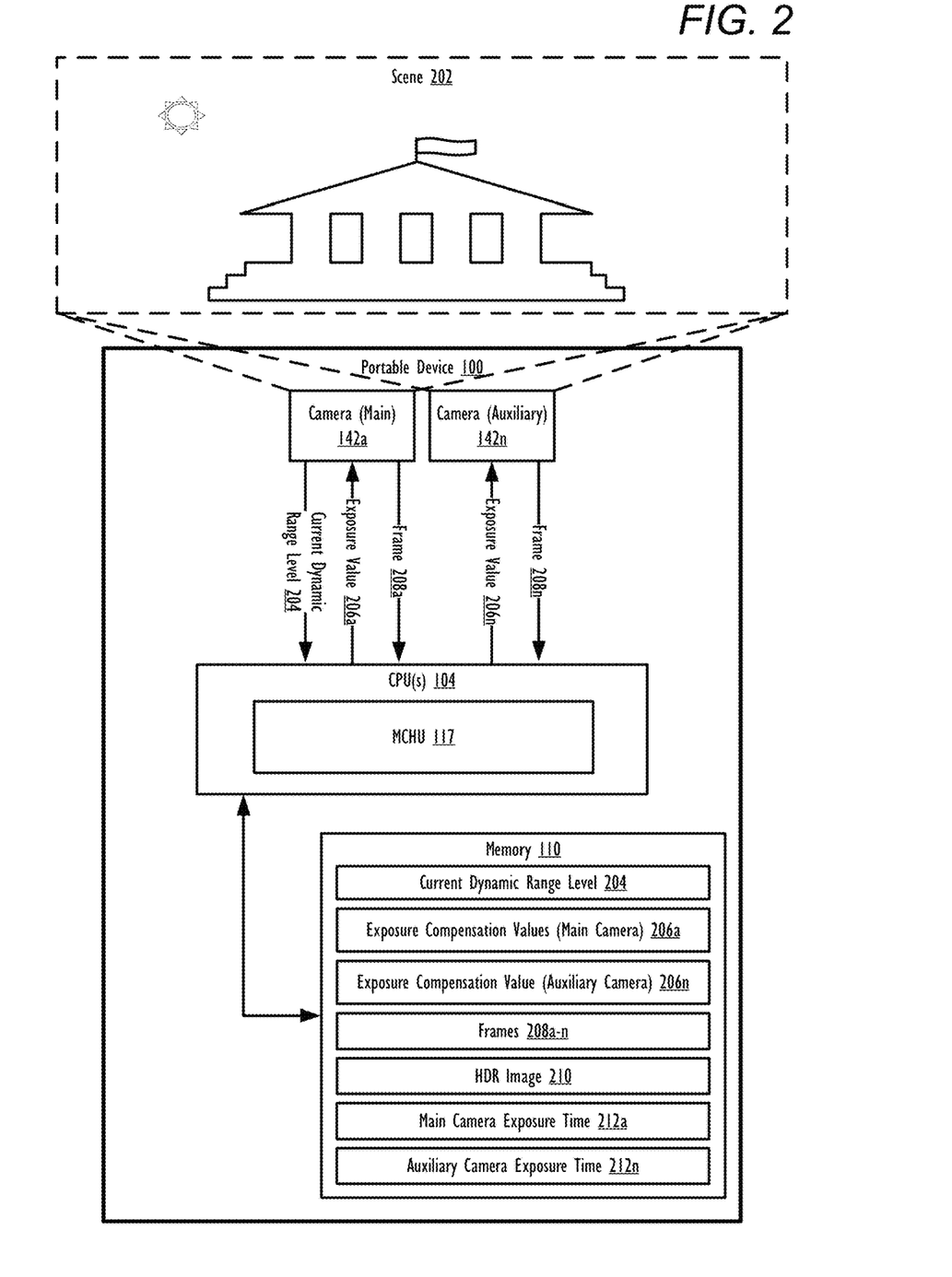
FIG. 2 illustrates an example portable device configured to generate a HDR image from frames simultaneously captured by a plurality of cameras, in accordance with one or more embodiments.

FIG. 2 is a block diagram illustrating an example portable device configured to generate a HDR image from frames simultaneously captured by a plurality of cameras, in accordance with one or more embodiments of the present disclosure. As illustrated, portable device 100 includes CPU(s) 104, memory 110, main camera 142a, and auxiliary camera 142n. CPU(s) 104 which executes MRU 117. In one or more embodiments, auxiliary camera 142n may include multiple auxiliary cameras.

Main camera 142a detects current dynamic range level 204 of scene 202. In accordance with one embodiment, current dynamic range level 204 describes a percentage of dark regions and bright regions in scene 202. In one embodiment, an image processing component associated with main camera 142a analyses scene 202 and calculates current dynamic range level 204 of scene 202 within a range, such as from 0 (low) to 100 (high). In response to detecting and based on current dynamic range level 204, CPU(s) 104 simultaneously calculates (1) a main camera exposure compensation value 206a for main camera 142a and (2) an auxiliary camera exposure compensation value 206n for auxiliary camera 142n. As utilized within the disclosure, an exposure compensation value is a real number that establishes a camera's shutter speed based on the focal ratio of the camera. Higher exposure compensation values decrease the shutter speed of a camera, while lower exposure compensation values (including values below zero) increase the shutter speed of a camera.

To determine main camera exposure compensation value 206a and auxiliary camera exposure compensation value 206n, CPU(s) 104 reads the current dynamic range level 204 from main camera 142a. Based on current dynamic range level 204, CPU(s) 104 calculates main camera exposure compensation value 206a and auxiliary camera exposure compensation value 206n. In one embodiment, main camera exposure compensation value 206a is calculated for a shorter exposure time (e.g., an exposure value (EV) −1.5) to capture at least one bright and/or overblown region in current scene 202 by main camera 142a and auxiliary camera exposure compensation value 206n is calculated for a longer exposure time (e.g., EV 2.0) to capture at least one dark region in current scene 202 by auxiliary camera 142n. In another embodiment, main camera exposure compensation value 206a is calculated for a longer exposure time and auxiliary camera exposure compensation value 206n is calculated for a shorter exposure time. The level of exposure compensation associated with main camera exposure compensation value 206a and auxiliary camera exposure compensation value 206n is based on current dynamic range level 204. For example, in response to determining current dynamic range level 204 corresponds to a highly dynamic scene, CPU(s) 104 simultaneously calculates an aggressive exposure compensation values for main camera exposure compensation value 206a (e.g., an exposure value (EV) of +2.0) and auxiliary camera exposure compensation value 206n (e.g., EV −1.5). In another example, in response to determining current dynamic range level 204 corresponds to a moderately dynamic scene, CPU(s) 104 calculates a moderate exposure compensation values (for main camera exposure compensation value 206a e.g., an EV of +0.5) and auxiliary camera exposure compensation value 206n (e.g., EV −0.6). In one or more embodiments, in response to determining current dynamic range level 204 corresponds to a low and/or flat dynamic scene, CPU(s) 104 applies a zero value to main camera exposure compensation value 206a.

In response to calculating main camera exposure compensation value 206a and auxiliary camera exposure compensation value 206n, CPU(s) 104 simultaneously calculates/determines (1) a main camera exposure time for main camera 142a based on the calculated main camera exposure compensation value and (2) an auxiliary camera exposure time for auxiliary camera 142n based on the calculated auxiliary camera exposure compensation value. The calculated exposure time represents an adjustment and/or modification to be applied to a current exposure time of a corresponding camera to enable that camera to properly capture at least one dark or bright region in current scene 202 based on current dynamic range level 204.

While two cameras (cameras 142a-n) are provided in the illustrated embodiment, in one or more embodiments more than two cameras may be used. When more than two cameras are used to capture frames of scene 202, an auxiliary camera compensation value is calculated for each auxiliary camera based on current dynamic range level 204. For example, when main camera 142a and three auxiliary cameras (auxiliary cameras 142b-d) are present, the processor calculates, for a highly dynamic scene, a main camera exposure compensation value of EV +2.0, auxiliary camera exposure compensation values 206b-d to EV values of −1.5, +0.5, and −0.6, respectfully. By establishing calculating exposure compensation values that include both short and long exposure times, the dynamic range of scene 202 that is captured by cameras 142a-d is increased.

In one or more embodiments, main camera 142a may continually monitor current dynamic range level 204. In one or more embodiments, CPU(s) 104 may dynamically recalculate main camera exposure compensation value 206a and auxiliary camera exposure compensation value(s) 206n in response to detecting a change in current dynamic range level 204. It should be noted that in one or more embodiments, the determining of current dynamic range level 204 and the calculating and application of exposure compensation values 206a-n is automatic and does not require the execution of any triggering logic on portable device 100 or user intervention.

Once main camera exposure compensation value 206a is applied to main camera 142a and auxiliary camera exposure compensation value(s) 206n are applied to auxiliary camera(s) 142n, cameras 142a-n may be used to capture frames 208a-n of current scene 202. In one embodiment, cameras 142a-n capture frames 208a-n in tandem in response to, for example, an actuation of camera shutter button (not pictured), which may be a physical button (e.g., button 106a) or virtual button, as described in greater detail FIG. 1. In response to determining frames 208a-n are to be captured, cameras 142a captures frame 208a at main camera exposure time 212a and auxiliary camera(s) 142n simultaneously captures frame(s) 208n at auxiliary camera exposure time(s) 212n. In one embodiment, captured frames 208a-n are stored in memory 110.

In response to capturing frames 208a-n, CPU(s) 104 retrieves frames 208a-n from cameras 142a-n and combines frames 208a-n to create HDR image 210. In one embodiment, HDR image 210 is stored in memory 110. In one or more embodiment, in response to creating HDR image 210, HDR image 210 is output on a display (e.g., display 145) and/or provided to an application (e.g., applications 118) of portable device 100. In one or more embodiments, in response to generating HDR image 210, frames 208a-n may be deleted from memory 110.

Figure 3:
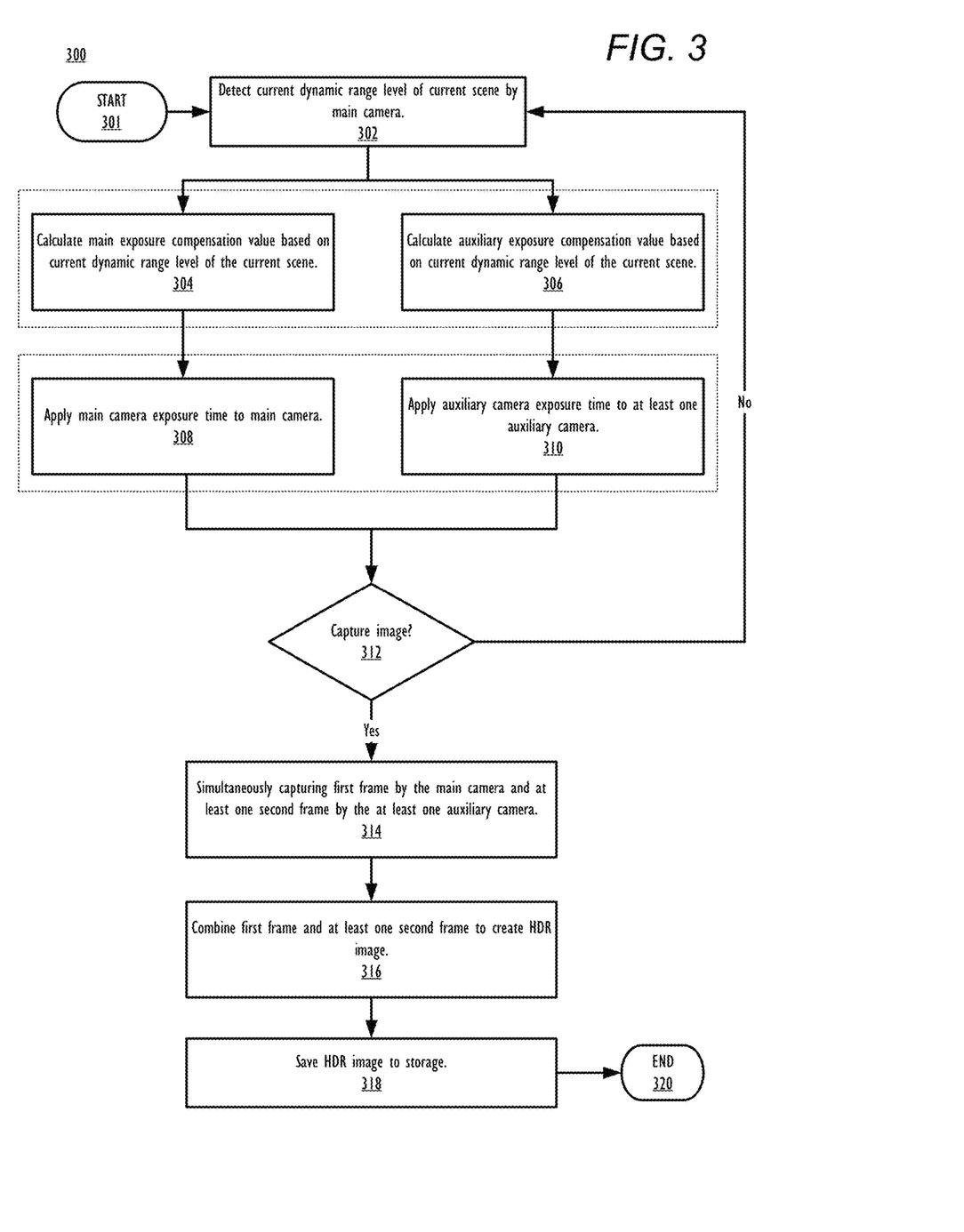
FIG. 3 is a flow chart illustrating a method for generating a HDR image from frames simultaneously captured by a plurality of cameras, in accordance with one or more embodiments.

Referring now to FIG. 3, there is depicted a high-level flow-chart illustrating a method for generating a HDR image from frames simultaneously captured by a plurality of cameras, in accordance with one or more embodiments of the present disclosure. Aspects of the method are described with reference to the components of FIGS. 1-2. Several of the processes of the method provided in FIG. 3 can be implemented by a processor (e.g., CPU 104) executing software code of MCHU 117 within a portable device (e.g., portable device 100). The method processes described in FIG. 3 are generally described as being performed by portable device 100.

Method 300 commences at initiator block 301 then proceeds to block 302. At block 302, main camera 142a detects the current dynamic range level (e.g., current dynamic range level 204) of a current scene (e.g., scene 202). In response to detecting current dynamic range level 204, the processor simultaneously calculates, based on current dynamic range level 204, (1) a main camera exposure compensation value (e.g., exposure compensation value 206a) for main camera 142a (block 304) and (2) an auxiliary camera exposure compensation value (e.g., exposure compensation values 206b-n) for each auxiliary camera (e.g., cameras 142b-n) (block 306). In response to calculating the main camera exposure compensation value and the auxiliary exposure compensation value(s), the processor simultaneously applies (1) a main camera exposure time that is associated with the main camera exposure compensation value to the main camera (block 308) and (2) an auxiliary camera exposure time that is associated with the calculated auxiliary exposure compensation value(s) to each auxiliary camera(s) (block 310).

At block 312, the processor determines whether frames 208a-n are to be captured (e.g., responsive to actuation of a shutter button). In response to determining frames 208a-n are to be captured, method 300 continues to block 314. In response to determining frames 208a-n are not to be captured, method 300 loops back to block 302.

At block 314, main camera 142a captures a first frame (e.g., frame 208a) and at least one second frame (e.g., frames 208b-n) are simultaneously captured by each auxiliary camera. In response to receiving multiple, simultaneously-captured, frames 208a-n, the processor combines captured frames 208a-n to create HDR image 210 (block 316). At block 318, HDR image 210 is saved to storage of portable device 100. Method 300 then terminates at end block 320.

Figure 4:
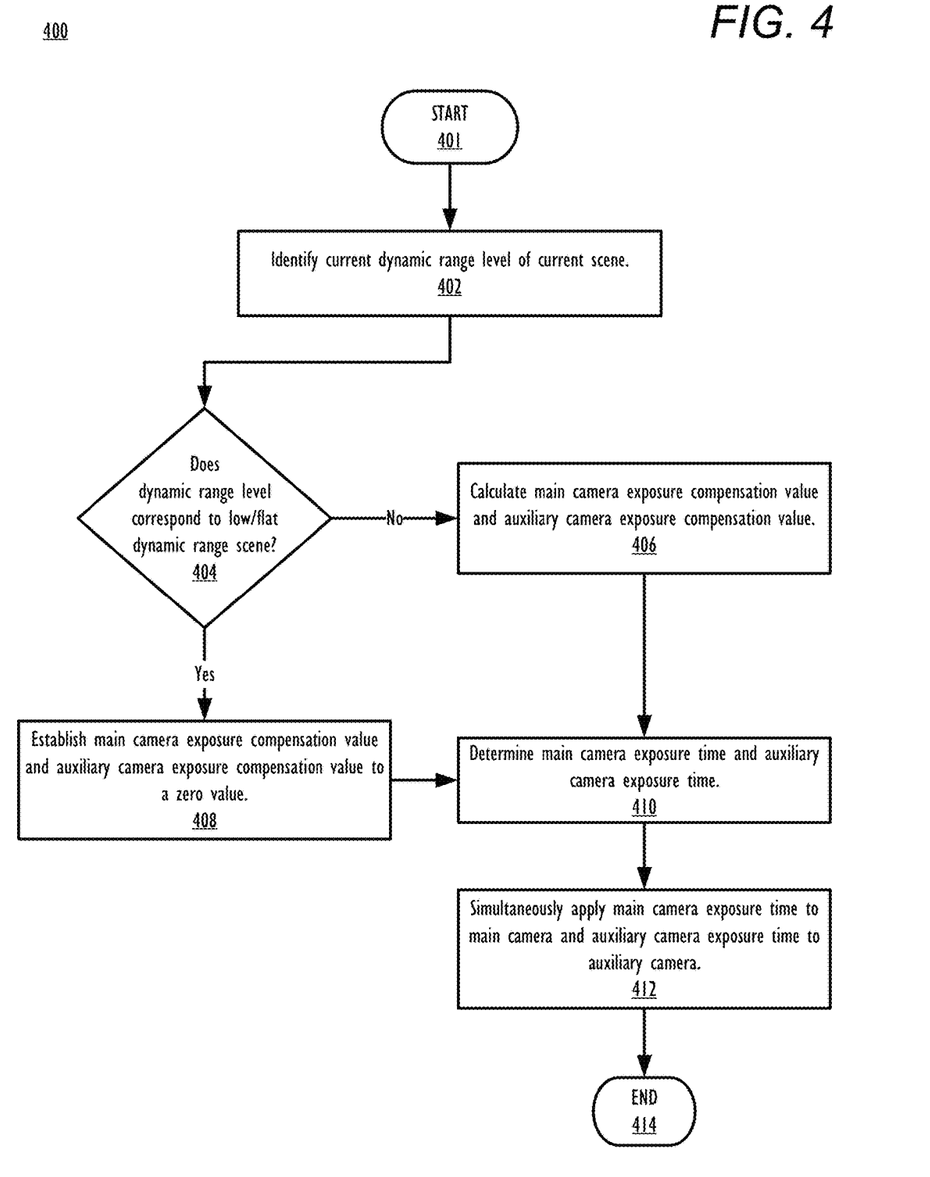
FIG. 4 is a flow chart illustrating a method for calculating an exposure compensation value that corresponds to a current dynamic range level of a current scene, in accordance with one or more embodiments.

Referring now to FIG. 4, there is depicted a high-level flow-chart illustrating a method for determining a main camera exposure compensation value, in accordance with one or more embodiments of the present disclosure. Aspects of the method are described with reference to the components of FIGS. 1-2. Several of the processes of the method provided in FIG. 4 can be implemented by a processor (e.g., CPU 104) executing software code of MCHU 117 within a portable device (e.g., portable device 100). The method processes described in FIG. 4 are generally described as being performed by portable device 100. In one embodiment, the method processes described in FIG. 4 may be included within blocks 304-310 of FIG. 3.

Method 400 commences at initiator block 401 then proceeds to block 402. At block 402, the processor identifies the current dynamic range level (e.g., current dynamic range level 204) of a current scene (e.g., scene 202) from main camera 142a. At block 404, the processor determines whether current dynamic range level 204 corresponds to a low/flat scene. In response to determining current dynamic range level 204 does not correspond to a low/flat scene, method 400 proceeds to block 406. At block 406, the processor calculates main camera exposure compensation value 206a and auxiliary camera exposure compensation value 206n based on current dynamic range level 204. In one embodiment, main camera exposure compensation value 206a meets the dynamic range of the current scene and corresponds to a short exposure time that enables main camera 142a, when capturing current scene 202, to properly expose at least one bright and/or overblown region. Auxiliary camera exposure compensation value 206n meets the dynamic range of the current scene and corresponds to a long exposure time that enables auxiliary camera 142n, when capturing current scene 202, to properly expose at least one dark region. Method 400 then proceeds to block 410.

In response to determining at block 404 that current dynamic range level 204 corresponds to a low/flat scene, the processor establishes both the main camera exposure compensation value and the auxiliary camera exposure compensation value to a zero value (block 408) and method 400 proceeds to block 410.

At block 410, the processor simultaneously determines (1) main camera exposure time 212a for main camera 142a based on the calculated main camera exposure compensation value and (2) an auxiliary camera exposure time 212n each auxiliary camera 142n based on the calculated auxiliary camera exposure compensation value(s). At block 412, the processor simultaneously applies (1) the main camera exposure time 212a to main camera 142a and (2) the auxiliary camera exposure 212n time to auxiliary camera 142n. Method 400 then terminates at end block 414.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting, by at least one of a main camera and at least one auxiliary camera, a current dynamic range level of a current scene, the current dynamic range level describing a percentage of dark regions and bright regions in the current scene;
   calculating by a processor, based on the current dynamic range level, a main camera exposure time and an auxiliary camera exposure time, each respective, calculated exposure times representing an adjustment or modification to be applied to a current exposure time of a corresponding camera to enable that camera to properly capture at least one dark or bright region in the current scene based on the current dynamic range level;
   applying the main camera exposure time to the main camera;
   applying the auxiliary camera exposure time to the at least one auxiliary camera, wherein the auxiliary camera exposure time is different from the main camera exposure time;
   simultaneously capturing a first frame by the main camera and at least one second frame by the at least one auxiliary camera; and
   combining the first frame and the at least one second frame to create a high dynamic range (HDR) image.

2. The method of claim 1, wherein the main camera exposure time and the auxiliary camera exposure time are simultaneously applied, and wherein the main camera detects the current dynamic range level of the current scene, the method further comprising:
   in response to detecting the current dynamic range level, synchronizing the current dynamic range level to the at least one auxiliary camera.

3. The method of claim 1, wherein determining the main camera exposure time and the auxiliary camera exposure time further comprises:
   calculating a main camera exposure compensation value based on the current dynamic range level;
   calculating an auxiliary camera exposure compensation value based on the current dynamic range level;
   determining the main camera exposure time based on the main camera exposure compensation value; and
   determining the auxiliary camera exposure time based on the auxiliary camera exposure compensation value.

4. The method of claim 3, wherein:
   the main camera exposure compensation value is associated with a short exposure time for exposing at least one bright region of the current scene; and
   the auxiliary camera exposure compensation value is associated with a long exposure time for exposing at least one dark region of the current scene.

5. The method of claim 3, further comprising:
   in response to determining the current dynamic range level of the current scene corresponds to a flat scene, establishing both of the main camera exposure compensation value and the auxiliary camera exposure compensation value to a zero value.

6. The method of claim 3, wherein the main camera exposure compensation value and the auxiliary camera exposure value are non-symmetrically related.

7. The method of claim 1, wherein detecting the current dynamic range level of the current scene comprises analyzing, by an image processing component associated with the main camera, the scene and calculating, by the image processing component, the current dynamic range level within the range.

8. The method of claim 1, wherein calculating a main camera exposure time and an auxiliary camera exposure time further comprises:
in response in response to determining current dynamic range level corresponds to a highly dynamic scene, calculating aggressive exposure compensation values for main camera exposure compensation value and auxiliary camera exposure compensation value; and
in response to determining current dynamic range level corresponds to a moderately dynamic scene, calculating moderate exposure compensation values and auxiliary camera exposure compensation value.

9. A device comprising:
a memory;
a main camera that is coupled to the memory and which detects a current dynamic range level of a current scene, the current dynamic range level describing a percentage of dark regions and bright regions in the current scene;
at least one auxiliary camera that is coupled to the memory; and
a processor that is communicatively coupled to the memory, the main camera, and the at least one auxiliary camera and which:
calculates, based on the current dynamic range level, a main camera exposure time and an auxiliary camera exposure time, each respective, calculated exposure times representing an adjustment or modification to be applied to a current exposure time of a corresponding camera to enable that camera to properly capture at least one dark or bright region in the current scene based on the current dynamic range level;
applies the main camera exposure time to the main camera;
applies the auxiliary camera exposure time to the at least one auxiliary camera,
wherein the auxiliary camera exposure time is different from the main camera exposure time;
wherein in response to the processor applying the main camera exposure time to the main camera and the auxiliary camera exposure time to the at least one auxiliary camera:
the main camera captures a first frame; and
the at least one auxiliary camera simultaneously captures at least one second frame; and
wherein the processor:
combines the first frame and the at least one second frame to create a high dynamic range (HDR) image; and
stores the HDR image in the memory.

10. The device of claim 9, wherein:
the main camera exposure time and the auxiliary camera exposure time are applied simultaneously; and
the processor, in response to detecting the current dynamic range level, synchronizes the current dynamic range level to the at least one auxiliary camera.

11. The device of claim 9, wherein in determining the main camera exposure time and the auxiliary camera exposure time, the processor:
calculates a main camera exposure compensation value based on the current dynamic range level;
calculates an auxiliary camera exposure compensation value based on the current dynamic range level;
determines the main camera exposure time based on the main camera exposure compensation value; and
determines the auxiliary camera exposure time based on the auxiliary camera exposure compensation value.

12. The device of claim 11, wherein:
the main camera exposure compensation value is associated with a short exposure time for exposing at least one bright region of the current scene; and
the auxiliary camera exposure compensation value is associated with a long exposure time for exposing at least one dark region of the current scene.

13. The device of claim 11, wherein in calculating the main camera exposure compensation value and the auxiliary camera exposure compensation value the processor:
in response to determining the current dynamic range level of the current scene corresponds to a flat scene, establishes both of the main camera exposure compensation value and the auxiliary camera exposure compensation value to a zero value.

14. The device of claim 11, wherein the main camera exposure compensation value and the auxiliary camera exposure value are non-symmetrically related.

15. A computer program product comprising:
a non-transitory computer readable storage device; and
program code on the computer readable storage device that when executed by a processor associated with a device, the program code enables the device to provide the functionality of:
detecting, by at least one of a main camera and at least one auxiliary camera, a current dynamic range level of a current scene, the current dynamic range level describing a percentage of dark regions and bright regions in the current scene;
calculating, based on the current dynamic range level, a main camera exposure time and an auxiliary camera exposure time, each respective, calculated exposure times representing an adjustment or modification to be applied to a current exposure time of a corresponding camera to enable that camera to properly capture at least one dark or bright region in the current scene based on the current dynamic range level;
applying the main camera exposure time to the main camera;
applying the auxiliary camera exposure time to at least one auxiliary camera, wherein the auxiliary camera exposure time is different from the main camera exposure time;
simultaneously capturing a first frame by the main camera and at least one second frame by the at least one auxiliary camera; and
combining the first frame and the at least one second frame to create a high dynamic range (HDR) image.

16. The computer program product of claim 15, wherein the main camera exposure time and the auxiliary camera exposure time are simultaneously applied and wherein the main camera detects the current dynamic range level of the current scene, the program code further comprising program code that enables the device to provide the functionality of:

in response to detecting the current dynamic range level, synchronizing the current dynamic range level to the at least one auxiliary camera.

17. The computer program product of claim 15, the program code for determining the main camera exposure time and the auxiliary camera exposure time further comprising program code that enables the device to provide the functionality of:

calculating a main camera exposure compensation value based on the current dynamic range level;

calculating an auxiliary camera exposure compensation value based on the current dynamic range level;

determining the main camera exposure time based on the main camera exposure compensation value; and determining the auxiliary camera exposure time based on the auxiliary camera exposure compensation value.

18. The computer program product of claim 17, wherein:

the main camera exposure compensation value is associated with a short exposure time for exposing at least one bright region of the current scene;

the auxiliary camera exposure compensation value is associated with a long exposure time for exposing at least one dark region of the current scene; and the program code further comprises program code that enables the device to provide the functionality of, in response to determining the current dynamic range level of the current scene corresponds to a flat scene, establishing both of the main camera exposure compensation value and the auxiliary camera exposure compensation value to a zero value.

* * * * *